3,047,412
Patented July 31, 1962

3,047,412
VISCOSE COMPOSITION AND METHOD OF SPINNING

Edwin H. Wolfe, Maplewood, N.J., assignor to General Aniline & Film Corporation, New York, N.Y., a corporation of Delaware
No Drawing. Filed Apr. 13, 1961, Ser. No. 102,655
12 Claims. (Cl. 106—165)

This invention relates to the production of high strength regenerated cellulose fibers from viscose.

It is known that the general strength and quality of fibrous regenerated cellulose products, especially rayon tire cord, can be achieved by the addition of "regeneration retardants" or "modifiers" to viscose prior to the spinning operation whereby an increase of the period in which the extruded filament is in a plastic-gel state between coagulation and regeneration. Several hundreds of diverse chemical compounds have been proposed as viscose modifiers. Of these, the aliphatic amines, quaternary ammonium salts, polyhydroxy polyamines, dithiocarbamates and polyoxyalkylene derivatives have received recognition and acceptance as capable modifiers. The latter derivatives generally involve products of ethoxylated dihydric saturated aliphatic alcohols.

To provide a process of manufacturing regenerated cellulose filaments having an improved firm structure and of high tenacity constitutes the principal object of the present invention.

Other objects and advantages will become more clearly apparent from the following description.

It has now been discovered that the incorporation of polyoxyethylenated butynediol in viscose results in the production of regenerated cellulosic shaped bodies such as filaments, films, sheets and the like having improved structure and high tenacity. The outstanding characteristics of the filaments, as compared to conventional filaments, are smooth, non-crenulated surfaces and the filaments consist entirely of skin.

The polyoxyethylenated butynediol employed as modifiers in the viscose bath in accordance with the present invention is product obtained by the conventional reaction of 1 mole of 2-butyne-1,4-diol with 4 to 20 moles of ethylene oxide by following any one of the procedures described in United States Patents 1,970,578; 2,213,477; 2,575,832; 2,593,112 and 2,676,975.

The resulting product is characterized by the following general formula:

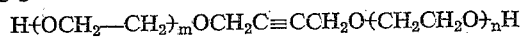

wherein $m$ and $n$ are integers of from 1 to 19 and $m+n$ equal 4 to 20.

Dehydrated grade of commercial 2-butyne-1,4-diol is ethoxylated directly by any one of the procedures described in the aforementioned patents.

The polyoxyethylenated butynediol prepared by any one of the procedures described in said patents is actually an adduct, i.e. a product formed by the reaction between ethylene oxide and the 2-butyne-1,4-diol. The ethylene oxide or the polyethyleneoxide chain replaces the hydrogen atoms of the hydroxy groups of the diol. As a result of this reaction, the distribution of the ethylene oxide units on each of the oxygen atoms of the hydroxy groups may be at random. In other words, the distribution may be equal and unequal, resulting in a mixture of specific compounds containing equal distribution as well as compounds containing unequal distribution of ethylene oxide units on each terminal oxygen atom of each of the hydroxy groups in the diol. By known analytical procedures it is possible to determine the average number of moles of ethylene oxide contained in a given polyoxyethylenated butynediol and other hydroxy compounds.

The distribution of ethylene oxide units in condensation reactions is more fully discussed in an article by R. C. Hyatt and R. L. Mayhew appearing in the Journal of the American Oil Chemist Society, volume 29, p. 357, 1952.

The amounts of the polyoxyethylenated butynediol that are added at any stage in the production of viscose, preferably after the cellulose xanthate has been dissolved in the caustic solution, may range from 1% to 5% by weight of the cellulose in the viscose bath. Filaments prepared from viscose containing the polyoxyethylenated butynediol have a high tensile strength, superior abrasion and fatigue resistance characteristics. The resulting filaments are exceptionally excellent for the manufacture of cords for the reinforcement of rubber products such as pneumatic tire casings and for other textile application requiring these characteristics.

The polyoxyethylenated butynediol is added to any viscose employed in the industry which normally contains from about 6% to about 10% of cellulose. The caustic soda content may vary from about 4% to 8% and the carbon disulfide content may vary from about 30% to about 50% based upon the weight of the cellulose. The viscose, after the addition of the polyoxyethylenated butynediol, may show a salt test above 5 and preferably about 7 to 8% at the time of spinning and extrusion.

The viscose utilized in the following examples was obtained from a chemical cellulose (prehydrolyzed sulfate) wood pulp by xanthation with 39% carbon disulfide based on the cellulose content of the alkali cellulose with churning for about 3 hours. The viscose composition contained 6.25% of cellulose and 5.75% caustic soda. The spinning viscosity was in the range of 60–70 poises. The polyoxyethylenated butynediol is added to the caustic solution and mixed for about one-half hour. The viscose was then allowed to ripen for about 40 hours at about 20° C. It is to be noted that the viscose ripening may be determined by the salt test and the indices are expressed as percentage of sodium chloride solution.

The spin bath may be varied so that it may contain from about 7 to 10% sulfuric acid, from about 12 to 23% of sodium sulfate and from 1 to about 10% of zinc sulfate. The temperature of the spinning bath may be from about 45 to 70° C. preferably at about 65° C. From the spinning bath, the filaments may be passed through a hot aqueous bath free from or containing about 10% of sulfuric acid and stretched anywhere from about 80 to 150%. The precise amount of stretching will of course depend upon the required tenacity and other properties of the filament or fiber to be produced.

Example 1

To the viscose solution prepared as above 1.8% of polyoxyethylenated butynediol containing an average of 9.7 moles of ethylene oxide per mole of 2-butyne-1,4-diol was added followed by mixing for about one-half hour. The viscose was then allowed to ripen and showed a salt test of 9. The viscose solution was then extruded through a spinnerette to form a 350 denier, 150 filament at a rate of 10 meters per minute. The coagulating and regenerating bath was maintained at about 65° C. and contained 9% sulfuric acid, 8% zinc sulfate and 20% of sodium sulfate. The yarn was passed over a godet and conducted through a hot water bath maintained at 92° C. While passing through the hot water bath, the yarn showed a stretching of approximately 90%. It was then passed through an aqueous bath containing 3% of sulfuric acid and 5% of sodium sulfate at about 50° C. in order to complete the regeneration. The yarn was collected in the usual manner and washed free of acids and salts and finally dried. The dried individual filaments showed a smooth non-crenulated exterior surface and consisted entirely of skin with no perceptible core being in evidence at a magnification of 1500×. The filaments of the controlled yarn spun with the same viscose but without the addition of the polyoxyethylenated butynediol showed very regular and crenulated surfaces and were composed of a skin portion and a core clearly defined between the skin and the core.

*Example 2*

Five separate viscose solutions as described in Example 1 were prepared and to each were added 2% of polyoxyethylenated butynediol of varying ethylene oxide content and the procedure as described in Example 1 followed through to the completion of the regeneration. The results of the appearance of the individual filaments are shown in the following table:

| Modifier | Appearance of Individual Filaments |
| --- | --- |
| 1 mole of 2-butyne-1, 4-diol condensed with— | |
| 1. Four moles ethylene oxide | Smooth, non-crenulated and all skin with no core. |
| 2. Six moles ethylene oxide | Same. |
| 3. Eight moles ethylene oxide | Same. |
| 4. Ten moles ethylene oxide | Same. |
| 5. Twenty moles ethylene oxide. | Same. |
| Control | Irregular, crenulated with sharp line of demarcation between skin and core. |

I claim:

1. A viscose composition containing from 1 to 5% of the cellulose in said viscose of a polyoxyethylenated butynediol containing an average of from 4 to 20 moles of ethylene oxide per mole of 2-butyne-1,4-diol.

2. A viscose composition according to claim 1 wherein the polyoxyethylenated butynediol contains 4 moles of ethylene oxide per mole of 2-butyne-1,4-diol.

3. A viscose composition according to claim 1 wherein the polyoxyethylenated butynediol contains 6 moles of ethylene oxide per mole of 2-butyne-1,4-diol.

4. A viscose composition according to claim 1 wherein the polyoxyethylenated butynediol contains 8 moles of ethylene oxide per mole of 2-butyne-1,4-diol.

5. A viscose composition according to claim 1 wherein the polyoxyethylenated butynediol contains 10 moles of ethylene oxide per mole of 2-butyne-1,4-diol.

6. A viscose composition according to claim 1 wherein the polyoxyethylenated butynediol contains 20 moles of ethylene oxide per mole of 2-butyne-1,4-diol.

7. The method of preparing shaped bodies of regenerated cellulose consisting entirely of skin which comprises spinning viscose containing from 1 to 5% of the cellulose of a polyoxyethylenated butynediol containing from 4 to 20 moles of ethylene oxide per mole of 2-butyne-1,4-diol.

8. The method according to claim 7 wherein the polyoxyethylenated butynediol contains 4 moles of ethylene oxide per mole of 2-butyne-1,4-diol.

9. The method according to claim 7 wherein the polyoxyethylenated butynediol contains 6 moles of ethylene oxide per mole of 2-butyne-1,4-diol.

10. The method according to claim 7 wherein the polyoxyethylenated butynediol contains 8 moles of ethylene oxide per mole of 2-butyne-1,4-diol.

11. The method according to claim 7 wherein the polyoxyethylenated butynediol contains 10 moles of ethylene oxide per mole of 2-butyne-1,4-diol.

12. The method according to claim 7 wherein the polyoxyethylenated butynediol contains 20 moles of ethylene oxide per mole of 2-butyne-1,4-diol.

References Cited in the file of this patent

UNITED STATES PATENTS

| 2,892,729 | Howsmon | June 30, 1959 |
| 2,895,787 | Hall | July 21, 1959 |
| 2,962,341 | Cox | Nov. 29, 1960 |
| 2,965,678 | Sandberg et al. | Dec. 20, 1960 |

OTHER REFERENCES

Elod et al.: Reyon Zellwolle und Andere Chemiefasern Jahrg., 1955, No. 33, pp. 321–323.